United States Patent [19]

Nagel

[11] 3,893,747
[45] July 8, 1975

[54] CONSTANTLY VIEWABLE REFLECTORIZED PEDAL

[75] Inventor: Robert I. Nagel, Skokie, Ill.

[73] Assignee: Beatrice Foods Company, Elgin, Ill.

[22] Filed: Dec. 28, 1973

[21] Appl. No.: 429,097

[52] U.S. Cl. ...................... 350/99; 350/97; 74/560
[51] Int. Cl.² ........................................... G02B 5/12
[58] Field of Search ............................ 350/97–109; 74/560

[56] References Cited
UNITED STATES PATENTS

| | | | |
|---|---|---|---|
| 3,541,606 | 11/1970 | Heenan et al. | 350/103 |
| 3,755,050 | 8/1973 | Golden | 350/103 |

*Primary Examiner*—Alfred E. Smith
*Assistant Examiner*—Michael J. Tokar
*Attorney, Agent, or Firm*—Hill, Gross, Simpson, Van Santen, Steadman, Chiara & Simpson

[57] ABSTRACT

A pedal assembly suitable for a foot-powered cycle type vehicle having reflectors mounted on pedal front and rear edge portions thereof. The pedals are adapted to retro-reflect light through an angle of at least about ±45° vertically measured with the pedal assembly horizontal. The assembly overcomes the undesired variability in intensity in reflected light observed in prior art reflectorized pedals caused by pedal oscillations in an operated cycle.

9 Claims, 15 Drawing Figures

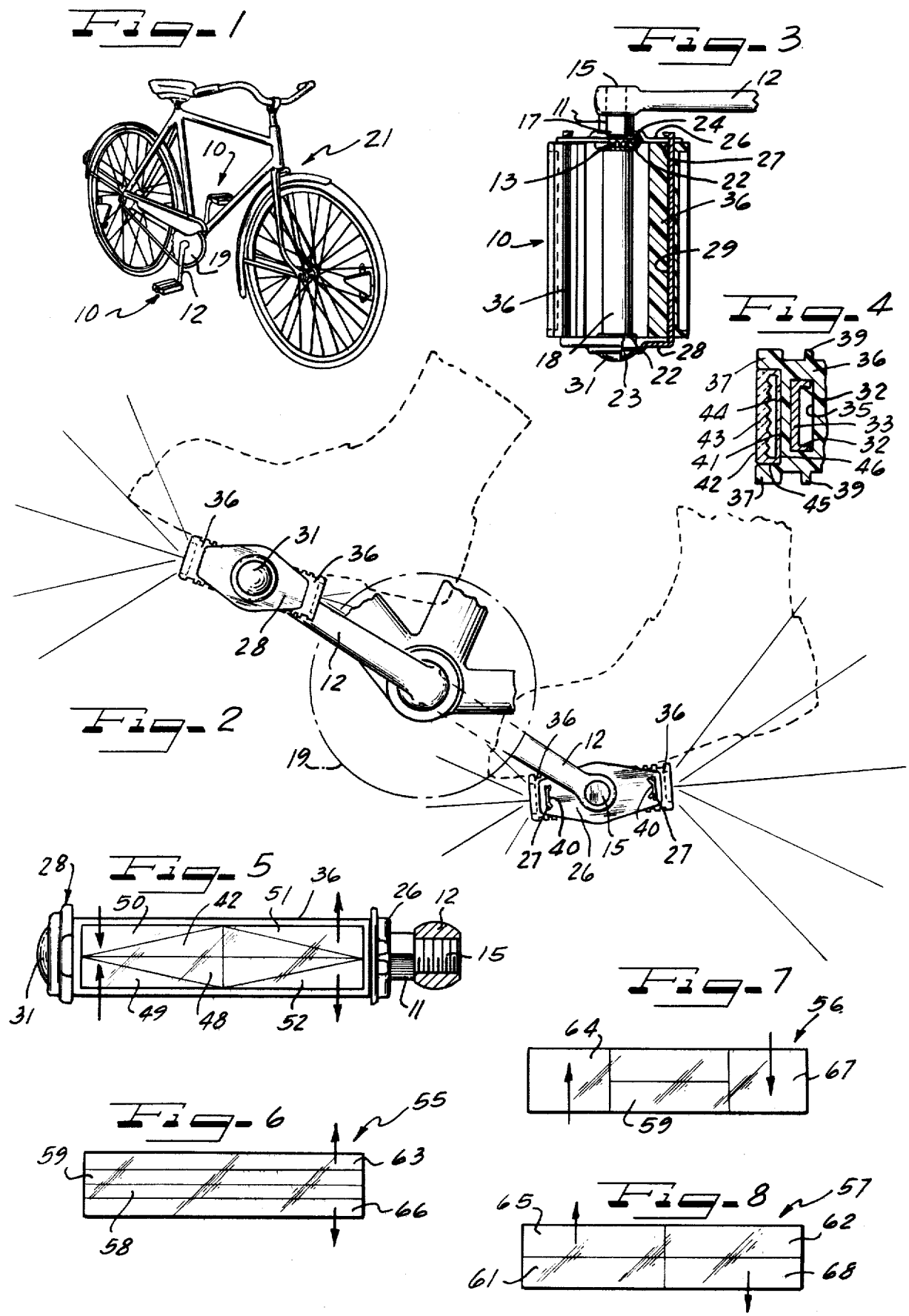

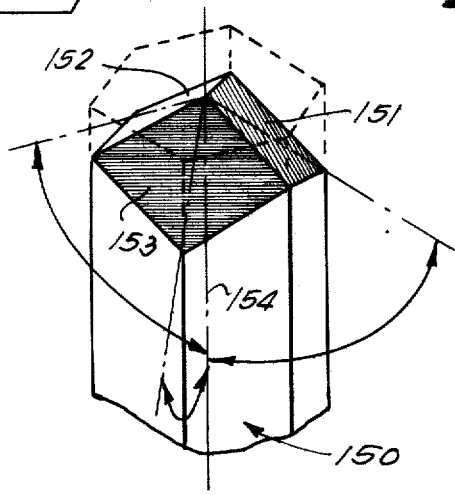
Fig-9
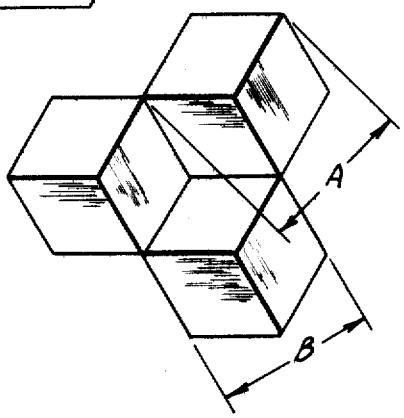
Fig-10
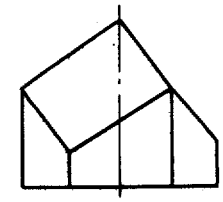
Fig-11
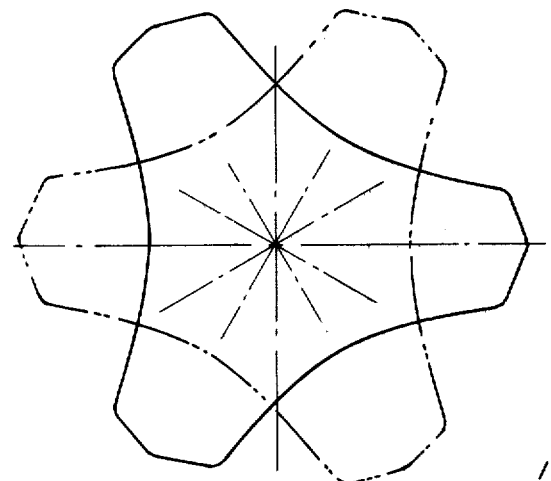
Fig-12
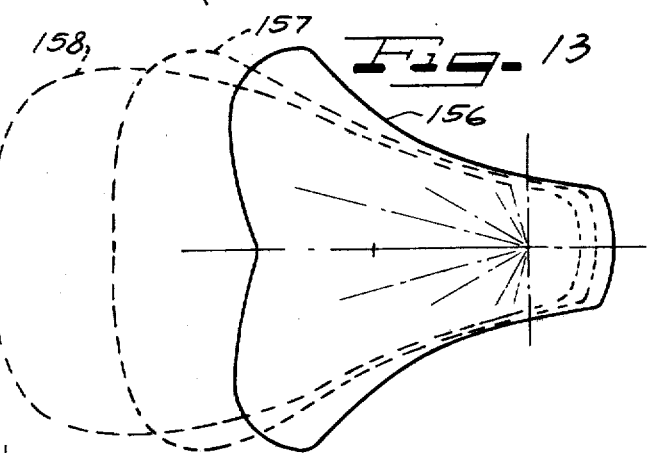
Fig-13
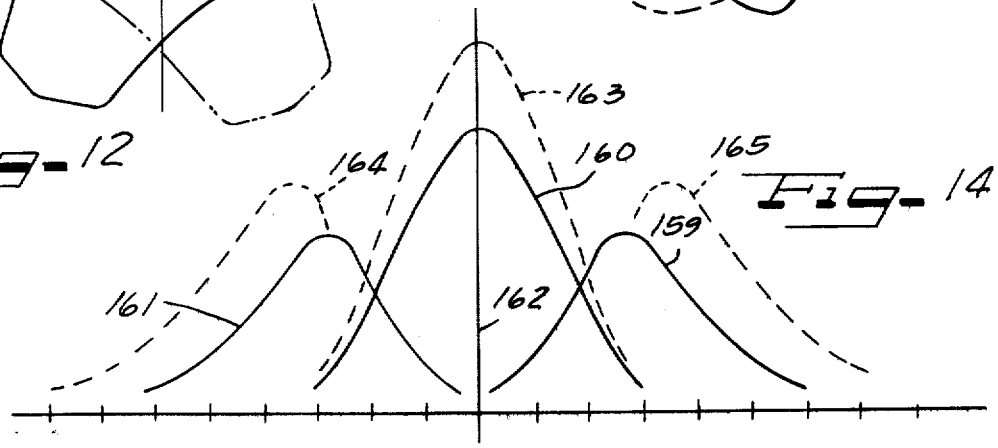
Fig-14
Fig-15
| 1.50 | 1.75 | 2.00 | 2.25 | | 6.75 | | 2.25 | 2.00 | 1.75 | 1.50 |
|---|---|---|---|---|---|---|---|---|---|---|
| 50° | 40° | 30° | 20° | | | | 20° | 30° | 40° | 50° |
4.50 × 10°
4.50 × 10°

CONSTANTLY VIEWABLE REFLECTORIZED PEDAL

BACKGROUND OF THE INVENTION

Conventional reflectorized pedals for bicycles and the like characteristically have only a single so-called "standard" reflective surface mounted along a side (e.g. front and rear) surface or surfaces of a pedal. Standard reflectors retro-reflect light only through an angle of up to about ± 30° vertically measured with the pedal assembly horizontal or with respect to a hypothetical center line transversely extending through the axis of a reflectorized pedal assembly.

As a cycle operator revolves the pedal crank with his feet resting upon a surface of each of the pedals on each of the crank's opposite ends, the pedals normally undergo an oscillatory action about the axis of each pedal as the crank moves through 360°. This oscillatory action causes a variability to appear in the light retro-reflected from reflective surfaces of a pedal side (e.g. front or rear) mounted reflector as respects the eye of a viewer generally end-wise located with respect to either end of an operated, moving bicycle or the like. Frequently this variability is intermittent and randomized, with entire periods existing in one 360° period of crank revolution when retro-reflected light from such a reflector is not visible at all with respect to such viewer. As a pedal ages, the variability tends to become worse, owing to the circumstance that the elastomeric pads on a pedal (and on the side of which the reflectors are mounted) tend to become loose and to be independently oscillatable in a pedal assembly in response to normal foot pressures of a cycle operation. The non-regularity of this variability adds to the problem of discerning such a pedal reflector at night. Consequently, such a reflectorized pedal is not nearly as effective a warning device as it would or could be if the reflective surfaces of a reflector edge mounted on the pedal assembly were capable of being continuously visible to the eye of an end-wise located viewer.

The problem of making such a reflectorized pedal able to be continuously viewable is heightened by the fact that all so called "standard" flat reflective surfaces heretofor employed in reflectorized pedals have the capacity to retro-reflect light incident thereon only through an angle of up to about ± 30° measured generally normally with respect to the face of such reflective surfaces. Recent observations demonstrate that a side of a bicycle pedal can oscillate about its pedal shaft through a vertical angle greater than about 30°, but usually less than about 45° when the pedal is engaged with the crank and the associated bicycle is being normally operated by a cyclist with new or substantially new pedals. Thus, a pedal equipped with conventional side mounted reflective surfaces, inherently displays periods of non-viewability. Such periods are inherently present and cannot be overcome by using a single, "standard" reflector body mounted in each side edge of a pedal.

To employ on pedals reflector bodies with curved surfaces, or to employ on pedals a plurality of reflector bodies angularly disposed or mounted on side edges of pedals would not only appear to increase manufacturing and assembly costs, but also appear to interfere with normal pedal function. Such angled reflector surfaces on a pedal could get in the way of a cyclists feet, possibly causing a nuisance or hazzard, or could even result in injury or permanent damage to the reflector surfaces.

BRIEF SUMMARY OF THE INVENTION

This invention is directed to a reflectorized pedal assembly which is believed to overcome these disadvantages of the prior art and which is adapted to provide a pedal assembly which can be continuously viewable to an end-wise located viewer during normal foot operation of a cycle equipped therewith.

Thus, an object of this invention is to provide a pedal assembly which is adapted to retro-reflect incident light striking a reflectorized side edge of such assembly at an angle ranging up to at least about ± 45° vertically with respect to a horizontal hypothetical center line transversely extending through such assembly.

Another object is to provide a reflectorized pedal assembly which can have a single reflector body with a flattened outside viewing surface positioned in each opposed side edge thereof and which is adapted to receive and retro-reflect incident light striking such viewing surface up to angles of at least about ± 45° vertically measured with such assembly in a horizontal position.

Another object is to provide a reflectorized pedal assembly of this type indicated which is adapted to uniformly retro-reflect incident light within angles ranging up to about ± 45° vertically measured with such assembly horizontally positioned.

Other and further aims, objects, purposes, advantages, utilities and features will be apparent to those skilled in the art from a reading of the present specification and drawings.

BRIEF DESCRIPTION OF THE DRAWINGS

In the drawings:

FIG. 1 is a perspective view of a bicycle equipped with one embodiment of a reflectorized pedal assembly of the present invention;

FIG. 2 is a fragmentary side elevational view through the crank region of the bicycle shown in FIG. 1;

FIG. 3 is a plan view of the pedal assembly of the bicycle shown in FIGS. 1 and 2, some parts thereof broken away and some parts thereof shown in section;

FIG. 4 is a fragmentary vertical sectional view through the pedal assembly of FIG. 3;

FIG. 5 is a side elevational view of the pedal assembly of FIG. 3;

FIG. 6 is a view similar to FIG. 5 but showing an alternative design for a relector member;

FIG. 7 is a view similar to FIG. 6 but showing a further alternative design;

FIG. 8 is a view similar to FIG. 6 but showing a still further alternative design;

FIG. 9 is an enlarged isometric view of one embodiment of a pin;

FIG. 10 is a top plan view of the hexagonal pattern produced by a plurality of pins in a retro-reflective reflector;

FIG. 11 is a side elevational view of one cube corner in a retro-reflective reflector body;

FIG. 12 is a plot of the characteristic retro-reflected light intensity produced by a plurality of facets of the type shown in FIG. 11;

FIG. 13 is a series of plots illustrating the manner in which the field of reflected light changes as the pin centers are angled from a vertical position to a position inclined to the vertical;

FIG. 14 shows illustrative plots for a reflector of the type having both standard reflector facets and wide angle reflector facets; and FIG. 15 is a plot illustrating the relationship between angle of reflected light and intensity of reflected light at such angle both horizontally and vertically for a combination of wide angle and standard reflectors in a single reflector body adapted for conventional horizontal wide angle retro-reflective applications.

DETAILED DESCRIPTION

Turning to the drawings, there is seen in FIGS. 1 through 5 an embodiment of a reflectorized pedal assembly of this invention herein designated in its entirety by the numeral 10. The pedal construction may be of any conventional sort, as those skilled in the art will appreciate. The embodiment shown employs a pedal shaft 11 which is threaded at one end 15 thereof and adapted to be connected with a crank arm 12 for rotatably driving sprocket 19 of bicycle 21. The shaft 11 has a cone 13 thereon adjacent each opposite end thereof which forms the inner races for ballbearings 17. The outer cone 13 is held in position by a snap ring or the like (not shown).

A hub 18 is rotatably mounted about the shaft 11 on ballbearings 17. Hub 18 has bell-shaped portions 22 flared outwardly at each opposite end thereof which, internally thereof, form the outer races for ballbearings 17. A radially outwardly extending flange 23 is integrally formed with hub 18 at the outer end of each such bell-shaped portion 22. The inner flange 23 abuts an annular surface 24 defining the inner margin of a recessed portion of a cross member or bar 26, and is welded or otherwise secured to such annular surface 24. The cross bar 26 has slots 27 at opposite ends thereof. Each slot 27 is adapted to accommodate therein a pedal block support 29 to be crimped thereto.

A cross bar 28 at the opposite end of the hub 18 from the cross bar 26 has an inwardly concavely dished portion 31 receiving the flange 23 of hub 18. The cross bar 28 also has the pedal block supports 29 formed integrally therewith and extending at right angles with respect thereto. The cross bar 28 and the pedal block supports 29 may be a metal stamping or the like. The pedal block supports 29 are shown as having a generally channel-like form with parallel, spaced flanges 32 extending from an outer web 33. The flanges 32 and the web 33 thus form a generally rectangular open support along which the hollow interior portion 35 of a pedal block 36 may be slid in assembling the pedal.

The pedal blocks 36 are preferably made from an opaque plastic material, such as a filled nylon, elastomer (rubber), or any other suitable plastic. Each pedal block 36 is shown to have generally cross sectionally rectangular beads 37 extending therealong at the corners thereof and as having ribs 39 extending along the pedal blocks 36 between the beads 37. The beads 37 and the ribs 39 are formed to provide a gripping means for a foot and, as those skilled in the art will appreciate, may be of various desired forms.

In assembling a pedal, the hub 18 is journalled on the shaft 10, and the pedal block supports 29 are bent at right angles with respect to the cross bar 28. The pedal blocks 36 are first slipped along the channeled portions of the pedal block supports 29 into engagement with the inner side of the cross bar 26. Tangs 40 extending from the webs 33 of the channels or block supports 29 are then extended through the slots 27 in cross bar 26, and the dished portion 31 of cross bar 28 is brought into firm engagement with the flange 23 of the outer bell-shaped portion 22. With the flange 23 in firm engagement with the dished portion 31, the tangs 40 are bent into an arcuate form such as shown in FIG. 2 with the opposite end portions thereof in engagement with the outer face of the cross bar 26 to hold the pedal in assembled relation.

In the lateral side edge of each pedal block 36, a recessed groove or channel 41 is formed. Channel 41 has a generally rectangular perimeter and is adapted to receive therein a molded reflector body 42. Each body 42 has a generally smooth flattened planar outside face 43 and further has an inside face 44 which is generally in spaced parallel relationship thereto. Inside face 44 has molded thereinto a plurality of retro-reflective faceted surfaces. About the perimeter of inside face 44 an integral upstanding shoulder 45 is formed. Across the ends of shoulder 45 is preferably mounted a backing plate member 46 which, in the embodiment shown, is a relatively thin sheet of plastic, though, as those skilled in the art will appreciate, the backing member 46 can be formed of any convenient material, including metal foil or the like. Adhesive (not shown) may be employed to bond the reflector body 42 and/or the associated plate member 46 within a channel 41. No backing plate 46 or the like is necessary. A body 42 can be formed so as to be adapted to be protected by a pedal block, as in a snap fit or the like. In the manufacturing operation, each pedal block 36 has a polyvinyl chloride core bearing therearound an acrylonitrile butadrene styrene (ABS) graft copolymer and a body 42 is sonically welded directly to the surface of the molded ABS.

Reflector body 42 preferably has at least three adjacent groups of facets formed in its inside face 44. Together, these groups adapt the outside face 43 to retro-reflect incident light striking thereagainst over angles ranging to at least about ± 45° transversely measured across each such side edge portion of a pedal block 36 normally thereto in a vertical plane. the interrelationship between hub 18, pedal block 36, the associated mounting means therefor, and the reflector bodies 42 is such that incident, horizontally traveling light normally striking an outside face 43 of molded body 42 in a vertical plane is retro-reflected when the shaft 11 is horizontally positioned, regardless of the angle of inclination of face 43 of body 42 about shaft 11 over angles equal to the retro-reflective angles which are as indicated above (e.g. ± 45°). Those skilled in the art will appreciate that any reflective surface of the type employed in the present invention can have a plurality of such planes, each one parallel to the other; no one plane is critical. One plane is simply used as a reference position for convenience.

Preferably, a reflectorized pedal assembly 10 when the shaft 11 thereof is horizontally positioned, has a reflector body 42 whose face 43 is further adapted to retro-reflect light horizontally traveling and striking face 43 thereof at an angle of up to about 45° horizontally measured from a perpendicular position outwardly away from the end 15 of shaft 10 and towards the opposite end thereof regardless of such inclination of such face 43 over vertical angles of about ± 45° from the horizontal about shaft 11.

While a reflector body 42 can be of any convenient construction, and can itself comprise a plurality of separately molded elements, a reflector body 42 preferably in the present invention is of one-piece, molded transparent plastic material, formed of an acrylic resin, or the like. As indicated above, the reflected facets molded into the inside face 44 of body 42 are preferably collected into at least three different groups. In body 42, these groups are collected into regions 48, 49, 50, 51 and 52 as viewed inside through face 43 (see FIG. 5). Each of the facets in region 48 is adapted to retro-reflect incident light through an angle from about 0° up to about ± 30° transversely so measured as indicated above. Each of the facets in respective regions 49 and 51 are adapted to retro-reflect incident light within an angle ranging from a lower angle which is not greater than the maximum retro-reflective angle of each of the facets comprising region 48 up to an angle of at least about 45° transversely so measured as indicated above (e.g. in the embodiment shown, above a horizontal plane perpendicularly passing through outside face 43 longitudinally through the mid-portion of face 43). Each of the facets comprising in the respective regions 50 and 52 are adapted to retro-reflect incident light within an angle ranging from a lower angle which is not greater than the maximum retro-reflective angle of each of the facets comprising region 48 down to an angle which is at least about 45° transversely so measured as indicated above. The facets comprising the region 48 may be regarded as comprising the first group of facets. The facets comprising the regions 49 and 51 may be regarded as comprising the second group of facets, while the facets comprising the regions 50 and 52 may be regarded as comprising the third group of facets. The second group of facets is thus adapted to retro-reflect light upwardly, and the third group of facets downwardly, so as to form an angle ranging up and down to at least about ± 45°, and which is preferably at least ± 50° transversely so measured as indicated above. Vertical angles up to as large as 70° to 88° can thus be encompassed, if desired, though at larger angles a lessening in the efficiency of retro-reflection tends to occur.

As those skilled in the art will appreciate, any convenient arrangement for the respective three or more groups of facets may be employed in a reflector body used in the practice of the present invention. Thus, in FIGS. 6, 7 and 8, respectively, is shown the reflectors 55, 56 and 57, respectively, each of which displays a different arrangement of the two groups of facets. Thus region 58 in reflector 55, region 59 in reflector 56, and regions 61 and 62 correspond to region 48 in reflector 42; region 63 in reflector 55, region 64 in reflector 56, and region 65 in reflector 57 correspond to regions 49 and 51 in reflector 42; and region 66 in reflector 55, region 67 in reflector 56, and region 68 in reflector 57 correspond to regions 50 and 52 in reflector 42.

The interrelationship between a group of facets in a retro-reflective reflector which is adapted to retro-reflect at an angle of ± 30° in one direction compared to a group of facets in such reflector adapted to retro-reflect at a side angle of up to about ± 45° is illustrated by FIGS. 9 through 15. In the manufacture of retro-reflective reflectors of the type used in the present invention a plurality of so-called pins 150 may be employed. Each pin, as shown here, is hexagonally shaped. The transverse distance B between flat sides is variable, but is typically of the order of about 0.094 inches, while distance A between opposing sides is similarly variable, but is typically about 0.108 inches. Three intersecting facets 151, 152 and 153 are formed at the forward end of each pin 150. Each facet 151, 152 and 153 traverses two sides of the hexagonal pin and has an apex coinciding with the axis of each pin 150. Each facet has an angle relative to the axis of about 35¼°.

The pins are arranged into a pattern such as shown in FIG. 10 and an electroform mold or the like is made using such pin pattern, the electroform being concurrently made by electroplating nickel or the like onto and over a plurality of aligned pin 151 heads. In such process the high points are reversed in mirror image fashion in the product mold (over the former low points in the pins) and vice versa, all as those skilled in the art will appreciate. From the product mold, a reflector element is molded. A section of the resulting reflector is shown in FIG. 11.

When a reflector body having a plurality of individual facets such as shown in FIG. 11 is caused to retro-reflect incident light, a characteristic pattern of reflected light results, in solid line form by an isocandle per foot candle curve in polar coordinates. When the facets of FIG. 10 are rotated through 180° there is produced a similar characteristic pattern as shown by the dotted line curve in FIG. 12.

However, when one tilts the axis 154 of each of a plurality of pins 151 arranged in a pattern such as shown in FIG. 10 from the vertical position shown in FIGS. 9–11, through increasing angles of common inclination, there is produced a changing family of characteristic patterns of reflected light such as shown in FIG. 13, each succeeding plot 156, 157 and 158 respectively, being an isocandle per foot candle curve in polar coordinates, each curve representing a greater inclination angle for a group of pins, which are electro formed into a mold, and then the mold used to make a reflector body. The plots of FIGS. 12 and 13 are not for any specific reflectors, but only are given herein to illustrate the principles involved, which are known already to those skilled in the art.

When one tilts the axes 154 of such a plurality of such pins 151 in the opposite direction, then is produced a changing family of characteristic curves like those in FIG. 13, but reversed.

When one combines into a single reflector body both the type of reflex reflectance shown in FIG. 12 with the type shown in FIG. 13, there is produced in a single reflector body both such types of reflex reflectance, that shown in FIG. 12 sometimes being known as a "standard" reflector having a characteristic reflectance value generally given as ± 30°, that shown in FIG. 13 sometimes being known as a "wide angle" reflector having a characteristic reflectance value which can range very widely from about 10° to 88°, though values between about 25° and 70° are particularly and preferably useful. Such a combination reflector body displays a plot of retro-reflectance angle versus reflected light intensity as shown in FIG. 14, lines 159, 160 and 161. Line 160 is produced by the so-called "standard" retro-reflective facets, line 159 is produced by the so-called "wide angle" retro-reflective facets sensitive to light on the right side of the ordinate 162, and line 161 is produced by the so-called "wide angle" retro-reflective facets sensitive to light on the left side of the ordinate 162.

If, for example, the number of "standard" facets is increased, the amount of reflected light increases (see dotted line 163). If, for example, both the number of "wide angle" facets and their respective angles of inclination are increased for both right and left hand members, the dotted lines 164 and 165 result. U.S. government federal standards for a bicycle reflector comprising such a combination of ledt and right wide angle reflector groups in combination with a centrally viewable standard reflector are shown in the illustrative plot of FIG. 15; such a reflector to be useful in the present invention would be oriented at right angles to the reflector type on which the FIG. 15 data is based, in that, for use in the present invention the wide angle coverage is in the vertical direction. By combining different pin groupings at different respective facet axis angles one can produce an unlimited gradation of retroreflectance characteristics in a given retro-reflector, so that any given reflector can be produced by one skilled in the art within the limitations of pins, materials of construction, design standards, and the like, using known technology.

Other and further embodiments and variations of the present invention will become apparent to those skilled in the art from a reading of the present specification taken together with the drawings and no undue limitations are to be inferred or implied from the present disclosure.

The claims are:

1. A reflectorized pedal assembly for a bicycle or the like comprising
   A. a pedal shaft means including means for connection at one end thereof to a cycle crank,
   B. A hub rotatably mounted on said pedal shaft means,
   C. a pair of elongated foot support means in spaced, generally aligned relationship to each other, each one on an opposite side of said hub,
   D. mounting means to secure said foot support means in fixed relationship to said hub,
   E. a pair of reflector units, each such reflector unit having at least one region comprised of transparent solid material and having a region axis normal thereto, said region having formed therein at least three groups of cube corner reflector elements, all such elements each having a central optical axis, the respective such optical axes of such elements in each such group being disposed substantially parallel to the respective such optical axes of the other such elements in each such group, the respective optical axes of such elements in one such group being generally parallel to said region axis, the respective optical axes of such elements in a second such group being inclined at a predetermined angle relative to said region axis, the respective optical axes of such elements in a third such group being inclined at a different predetermined angle relative to said region axis, said region being retroreflective of light directed thereon over an angle extending up to at least about 45° on either side of said region axis in a plane extending through said region axis,
   F. each such reflector unit being adapted for functional association with a longitudinal side of a different one of said foot support means and having both its respective said region axis and its respective said plane generally normal to the axis of rotation of said hub relative to said pedal shaft means, the respective region axes of such reflector units being generally parallel to each other when each such reflector unit is so associated with said foot support means, and
   G. mounting means to mount each such reflector unit fixedly in such association with said foot support means.

2. The reflectorized pedal assembly of claim 1 wherein said region of each such reflector means is also retroreflective of light directed thereon over an angle extending up to at least about 45° to the side of said region axis of each such reflector means parallely to said axis of rotation of said hub outwardly away from said end for connection.

3. The reflectorized pedal assembly of claim 1 wherein each such reflector means is a one-piece molded member of transparent plastic having a generally smooth outside face and having its groups of cube corner reflector elements formed on the inside face thereof and further having edge portions adapted for mountability in such sides of said foot support means.

4. The reflectorized pedal assembly of claim 1 wherein said region is retroreflective of light directed thereon over an angle extending up to at least about 50° on either side of said region axis in a plane extending through said region axis.

5. The reflectorized pedal assembly of claim 1 wherein each such reflector means is yellow in color.

6. The pedal assembly of claim 3 wherein said foot support means have elastomeric side edge portions of molded opaque plastic composition.

7. The pedal assembly of claim 1 wherein said reflector means are each of one-piece molded transparent plastic composition and said reflector means are inset into each of said respective side edge portions.

8. The pedal assembly of claim 1 wherein said foot support means have elastomeric side edge portions of molded opaque plastic composition, said reflector means are each of one-piece molded clear plastic composition, and said reflector means are inset into each of said respective side edge portions.

9. The pedal assembly of claim 1 wherein each of said reflector means has a flattened reflective face.

* * * * *